United States Patent
Sorenson, III et al.

(10) Patent No.: US 8,316,213 B1
(45) Date of Patent: Nov. 20, 2012

(54) MANAGEMENT OF OBJECT MAPPING INFORMATION CORRESPONDING TO A DISTRIBUTED STORAGE SYSTEM

(75) Inventors: James Christopher Sorenson, III, Seattle, WA (US); Gunavardhan Kakulapati, Bellevue, WA (US); Jason G. McHugh, Seattle, WA (US); Allan H. Vermeulen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 450 days.

(21) Appl. No.: 12/533,885

(22) Filed: Jul. 31, 2009

(51) Int. Cl.
 *G06F 00/12* (2006.01)
(52) U.S. Cl. .................................................. 711/216
(58) Field of Classification Search ............... 711/216
 See application file for complete search history.

(56) References Cited

U.S. PATENT DOCUMENTS

| | | | |
|---|---|---|---|
| 7,505,997 B1 | 3/2009 | Gelf | |
| 7,647,329 B1 | 1/2010 | Fischman et al. | |
| 7,801,912 B2 | 9/2010 | Ransil et al. | |
| 7,925,624 B2 | 4/2011 | Vosshall et al. | |
| 2007/0156842 A1 | 7/2007 | Vermeulen et al. | |
| 2007/0168336 A1 | 7/2007 | Ransil et al. | |

OTHER PUBLICATIONS

Cooper, Brian F. et al., "PNUTS: Yahoo!'s Hosted Data Serving Platform", ACM VLDB '08, 2008, pp. 1277-1288.
Decandia, Giuseppe et al., Dynamo: Amazon's Highly Available Key-value Store, AMC SOSP '07, 2007, pp. 205-220.

*Primary Examiner* — Yaima Campos
*Assistant Examiner* — Hamdy S Ahmed
(74) *Attorney, Agent, or Firm* — Knobbe Martens Olson & Bear LLP

(57) ABSTRACT

Systems and methods for managing mapping information for objects maintained in a distributed storage system are provided. The distributed storage system can include a keymap subsystem that manages the mapping information according to object keys. Requests for specific object mapping information are directed to specific keymap coordinators within the keymap subsystem based on a consistency based hashing schema. The hashing schema is updated and distributed to other components within the distributed storage system based on a defined distribution model.

19 Claims, 11 Drawing Sheets

MANAGEMENT OF OBJECT MAPPING INFORMATION CORRESPONDING TO A DISTRIBUTED STORAGE SYSTEM

BACKGROUND

Generally described, many different computing applications rely on some type of storage medium for the persistent storage of various kinds of application data. For example, common office applications and multimedia applications generate and use application data of various types and formats, such as documents, spreadsheets, still images, audio and video data, among others. Frequently, such data is stored for repeated access or use on behalf of a user. For example, a user may wish to store and work with a number of documents or other data over a period of time, and may expect that the data will be readily available in a predictable state when needed.

In some computing systems, the storage medium used by applications for persistent application data storage is most commonly a magnetic fixed drive or "hard drive." Such devices are typically either integrated within a computer system that executes the applications or accessible to that system via a local peripheral interface or a network. Such devices serve as application storage are managed by an operating system to present a consistent storage interface, such as a file system interface, to various applications needing storage access.

The conventional model of application storage presents several limitations. First, it generally limits the accessibility of application data. For example, if application data is stored on the local hard drive of a particular computer system, it may be inaccessible to applications executing on other systems. Even if the data is stored on a network-accessible device, applications that execute on systems outside the immediate network may not be able to access that device. For example, for security reasons, enterprises commonly restrict access to their local area networks (LANs) such that systems external to the enterprise cannot access systems or resources within the enterprise. Thus, applications that execute on portable devices (e.g., notebook or handheld computers, personal digital assistants, mobile telephony devices, etc.) may experience difficulty accessing data that is persistently associated with fixed systems or networks.

Conventional application storage model approaches also may fail to adequately ensure the reliability of stored data. For example, conventional operating systems typically store one copy of application data on one storage device by default, requiring a user or application to generate and manage its own copies of application data if data redundancy is desired. While individual storage devices or third-party software may provide some degree of redundancy, these features may not be consistently available to applications, as the storage resources available to applications may vary widely across application installations. The operating-system-mediated conventional storage model may also limit the cross-platform accessibility of data. For example, different operating systems may store data for the same application in different, incompatible formats, which may make it difficult for users of applications executing on one platform (e.g., operating system and underlying computer system hardware) to access data stored by applications executing on different platforms.

BRIEF DESCRIPTION

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
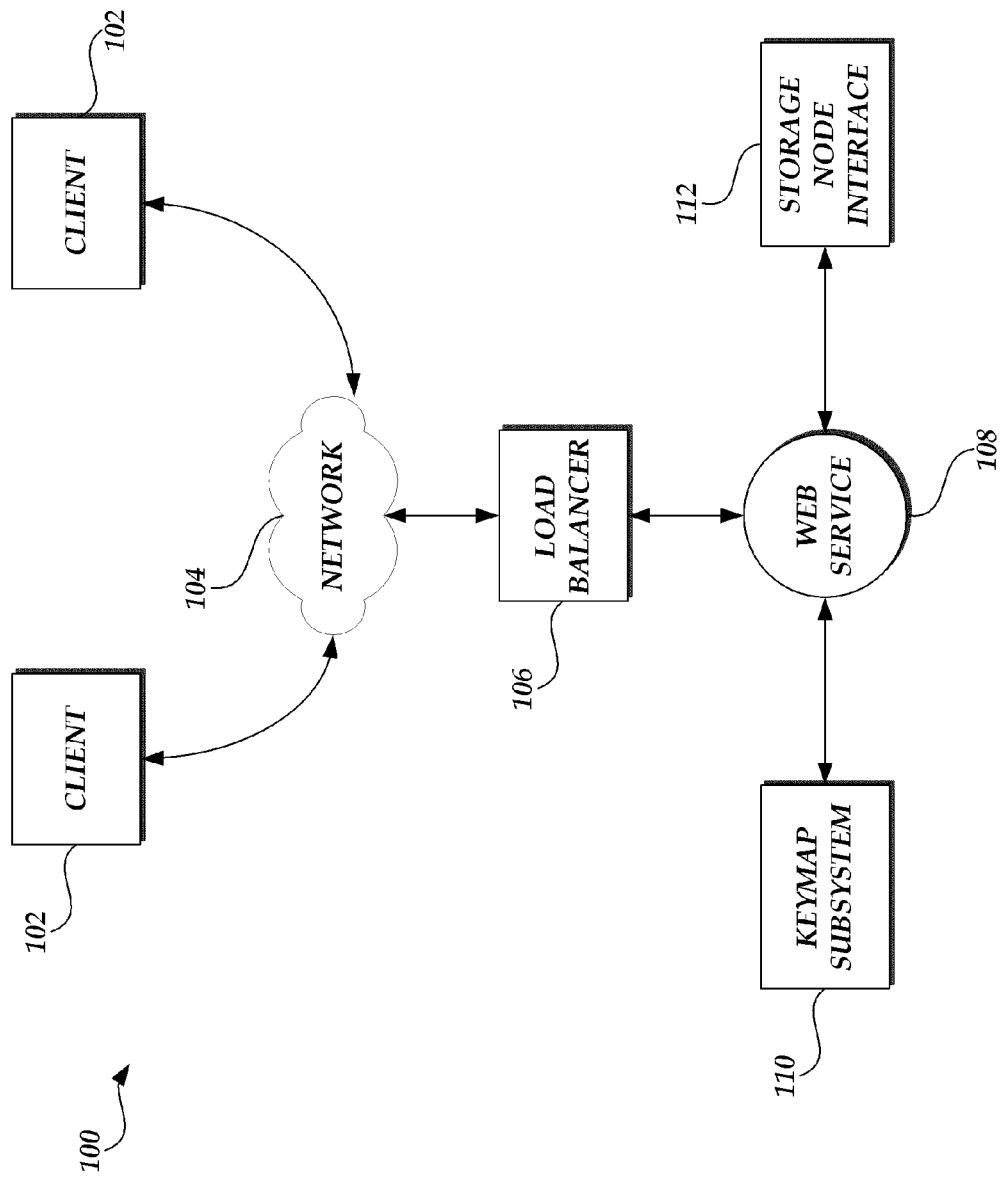
FIG. 1 is a block diagram illustrative of a distributed storage network.

Generally described, the present disclosure is directed to managing keymap information corresponding to objects maintained in a distributed storage network. Specifically, aspects of the disclosure will be described with regard to techniques for the management of keymap coordinators within a keymap subsystem of a distributed storage network. Specifically, in accordance with embodiments, keymap information requests may be routed to specific keymap coordinator components that are part of a keymap subsystem by utilizing consistent hashing scheme. The consistent hashing scheme may be propagated to different components via a peer-to-peer distribution model of a storage network to facilitate interaction with the keymap subsystem. Additionally, aspects of the disclosure will be described with regard to various techniques for implementing and managing cached keymap information within a keymap subsystem. Specifically, in accordance with embodiments, cached keymap information may be associated with identifiers, generally referred to as generation identifiers, utilized to facilitate the identification of expired cached keymap information. In accordance with other embodiments, cached keymap information may also incorporate keymap information placeholders indicative of pending updates to keymap information. In accordance with still other embodiments, a keymap coordinator, or other component of a keymap subsystem, may apply cache optimization techniques to facilitate the caching of information related to multiple components within the storage network.

Although the present disclosure will be described with regard to illustrative examples and embodiments, one skilled in the art will appreciate that the disclosed embodiments and examples should not be construed as limiting. The various embodiments may be practiced in combination or individually. Accordingly, the disclosed and described embodiments should not be construed as requiring any particular combination or excluding any combination unless specifically identified in the disclosure.

Generally described, one embodiment of a storage model for providing data storage to users is implemented as a service, such as a Web service. In this example, a storage service interface is provided as a customer- or user-facing interface to the storage service. According to the model presented to a user by interface, the storage service may be organized as an arbitrary number of stores, generally referred to as "buckets," that are accessible via interface. Each bucket may be configured to store an arbitrary number of objects, which in turn may store data specified by a user of the storage service.

Generally speaking, a bucket may function as the root of an object namespace that is associated with a user of the storage service. For example, a bucket may be analogous to a file system directory or folder. In some embodiments, individual buckets may also form the basis for accounting for usage of the storage service. For example, a user may be associated with one or more buckets for billing purposes, and that user may be billed for usage of storage resources (e.g., storage of object) that hierarchically reside within the namespace established by those buckets.

Illustratively, each of the buckets includes associated metadata. Generally speaking, metadata may include any suitable metadata that may be used to describe aspects or properties of a given bucket. For example, metadata may include information identifying the date of a bucket's creation, the identity of its creator, whether the bucket has any objects associated with it, or other suitable information. In some embodiments, metadata may include information indicative of usage characteristics of a bucket, such as the total size of objects associated with bucket, access history of users with respect to bucket and/or its associated objects, billing history associated with bucket, or any other suitable information related to current or historical usage of bucket. In one embodiment, each bucket may be associated with a respective unique identifier, which may be specified by a user or automatically assigned by the storage service. The unique identifier may be stored within metadata or as a separate property or field of bucket. It is noted that in some embodiments, a given bucket may not include explicit references, pointers or other information corresponding to the objects associated with given bucket. Rather, as described in greater detail below, location and selection of objects may be performed through the use of a separate mapping facility referred to herein as a keymap.

Still further, each of the buckets may also include respective access policies. Generally described, an access policy may include any information needed to control access to objects associated with a bucket. The access policy may include information identifying the client or clients allowed to access a bucket and its associated objects, and in what capacity. For example, access policy may store a user identifier and/or authentication credentials (e.g., public/private authentication keys) for one or more clients, and may further specify whether a given client is allowed to modify or only read objects. The access policy may also implement default or group-oriented policies (e.g., by allowing universal read access but limiting write access to objects to a specified client or group of clients) or any other desired security model.

In an illustrative embodiment, buckets may be associated with one or more objects, each of which may include respective metadata and data. Additionally, a bucket may exist with no objects. Generally speaking, data of an object may correspond to any sequence of bits. The type of data represented by the bits stored within an object may be transparent to the storage service. That is, the bits may represent text data, executable program code, audio, video or image data, or any other type of digital data, and the storage service may not necessarily distinguish among these various data types in storing and manipulating objects. In some embodiments, the size of data may be limited to a fixed ceiling, while in other embodiments, objects may be allowed to scale in size subject only to the physical storage resources available to the storage service.

Similarly, metadata may be configured to store any desired descriptive information about its corresponding object. For example, metadata may include information about the date and/or time the corresponding object was created, the size of object, the type of data stored by object (e.g., a data type defined by the Multipurpose Internet Mail Extensions (MIME) standard), or any other type of descriptive information. In some embodiments, metadata may store usage or history information indicative of user interactions with corresponding object, as well as access policy information (e.g., permission information indicating the types of access various users may have to the object), object cost information (e.g., billing rate or history associated with the object), or any other suitable information or combination of types of information attributable to object. For example, a client may provide metadata along with object data to be stored as metadata. In other examples, metadata may include metadata generated by the system that manages storage service features. Some, all or none of metadata may be accessible to a client having access rights to an object, depending on the type of metadata, specific provisions of the client's access rights, or other suitable factors.

In some embodiments storage service interface may be configured to support interaction between the storage service and its users according to a Web services model. For example, in one embodiment, interface may be accessible by clients as a Web services endpoint having a Uniform Resource Locator (URL), e.g., http://identifier.storageprovider.com, to which Web services calls generated by service clients may be directed for processing. A Web service may refer to any type of computing service that is made available to a requesting client via a request interface that includes one or more Internet-based application layer data transport protocols, such as a version of the Hypertext Transport Protocol (HTTP) or another suitable protocol.

Web services may be implemented in a variety of architectural styles, using a variety of enabling service protocols. For example, in a Representational State Transfer (REST)-style Web services architecture, the parameters that are pertinent to a Web services call (e.g., specifying the type of service requested, user credentials, user data to be operated on, etc.) may be specified as parameters to the data transport command that invokes the Web services call to the Web services endpoint, such as an HTTP GET or PUT command. In some implementations, REST-style Web services architectures are stateless, in that each Web services call may contain all the information necessary to process that call without reference to external state information. In contrast to REST-style Web services architectures, document-based or message-based Web services architectures may encode the parameters and data pertinent to a Web services call as a document that may be transmitted to a Web services endpoint and then decoded and acted upon by the endpoint. In another embodiment, Web services may be implemented to utilize peer-to-peer distribution models and architectures, such as the BitTorrent file sharing communication protocol.

In alternative embodiments, the interface may support interfaces other than Web services interfaces, instead of or in addition to a Web services interface. For example, an enterprise may implement a storage service for use by clients external to the enterprise, who may access the service via Web services protocols, as well as users within the enterprise, who may use a different type of interface (e.g., a proprietary interface customized to the enterprise's intranet). In some embodiments, interface may support each of the various types of interfacing protocols through which any user of the storage service may access the service. In other embodiments, different instances of interface may be provided for each distinct interface approach. It is noted that in some embodiments, those aspects of interface related to handling interactions with clients (e.g., receiving and responding to service requests) may be implemented separately from those aspects that implement the general architecture of the storage service (e.g., the organization of the service into a hierarchy of buckets and objects). In some such embodiments, the portion of interface relating to client interaction (e.g., via Web services protocols) may be bypassed by certain users, such as those internal to an enterprise.

In one embodiment, individual objects may be identified within the distributed storage network using either of two distinct items of information: a key or a locator. Generally speaking, keys and locators may each include alphanumeric strings or other types of symbols that may be interpreted within the context of the namespace of the distributed storage network as a whole, although keys and locators may be interpreted in different ways. In one embodiment, a key may be specified by a client, or on behalf of a client, at the time a corresponding object is created within a particular bucket (e.g., in response to a request by the client to store a new object). If no key is specified by the client, a key may be assigned to the new object by the distributed storage network. In such an embodiment, each respective key associated with objects of a particular bucket may be required to be unique within the namespace of that bucket.

With reference above, a locator may represent a globally unique identifier (GUID) of an object among all objects known to the distributed storage network. That is, while a key may be unique to a namespace associated with a particular bucket, a locator may be unique within a global namespace of all objects within all buckets. For example, a locator may include an alphanumeric string generated by the distributed storage network to be unique among other locators. As described in greater detail below, in some embodiments, multiple instances of an object may be replicated throughout the physical storage devices used to implement the distributed storage network, for example to increase data redundancy and fault tolerance. In such embodiments, a unique locator may exist for each replicated instance of a given object. As will be described in greater detail below, in illustrative embodiments, keymap information can correspond to a mapping of an object key to one or more corresponding locators. The keymap information may be maintained by a keymap subsystem and utilized by a distributed storage network to access objects maintained by the distributed storage network. Further, the keymap information may be updated, or otherwise modified, as instances of specific objects are created, deleted, or otherwise manipulated within the distributed storage network.

With reference now to FIG. 1, a block diagram illustrative of a distributed storage network 100 will be described. The distributed storage network 100 includes one or more storage clients 102. In an illustrative embodiment, the storage clients 102 may be configured to interact with a Web services interface 108 via a communication network 104 and a load balancing component 106. The load balancing component may be considered a separate component, as illustrated in FIG. 1. Alternatively, the load balancing component 106 may be integrated as a component on other components of the distributed storage network 100.

The Web services interface 108 may be configured to interface with a keymap subsystem 110 for obtaining specific mappings of keys to object instance locators. The keymap subsystem 110 will be described in greater detail with regard to FIG. 3, below. The Web services interface 108 may also be configured to interface with a storage node interface 112 to facilitate the sending of instructions to specific nodes of the distributed storage network 100. For example, the storage node interface 112 can be configured to interface with a file system, such as via a storage node management (SNM) controller, which is in turn configured to manage one or more physical storage devices. The Web service interface 108 may utilize predefined instructions or communications, such as via defined application protocol interfaces (APIs), to communicate with the keymap subsystem 110 or storage node interface 112.

In various embodiments, the components illustrated in FIG. 1 may be implemented directly within computer hardware, as instructions directly or indirectly executable by computer hardware (e.g., a microprocessor or computer system), or a combination of these techniques. For example, the components of the distributed storage network 100 may be implemented by a distributed system including a number of computing nodes (or simply, nodes). In various embodiments, the functionality of a given distributed storage network component may be implemented by a particular node or distributed across several nodes. In some embodiments, a given node may implement the functionality of more than one distributed storage network component.

With continued reference to FIG. 1, the storage clients 102 may encompass any type of client configurable to submit Web services requests to Web services interface 108 via network 104. For example, a given storage client 102 may include a suitable version of a Web browser, or a plugin module or other type of code module configured to execute as an extension to or within an execution environment provided by a Web browser. Alternatively, a storage client 102 may encompass an application such as a database application, media application, office application, or any other application that may make use of persistent storage resources. In some embodiments, such an application may include sufficient protocol support (e.g., for a suitable version of Hypertext Transfer Protocol (HTTP)) for generating and processing Web services requests without necessarily implementing full browser support for all types of Web-based data. That is, storage client 102 may be an application configured to interact directly with Web services interface 108. As described below, storage client 102 may be configured to generate Web services requests according to a Representational State Transfer (REST)-style Web services architecture, a document or message-based Web services architecture, or another suitable Web services architecture.

In other embodiments, storage client 102 may be configured to provide access to Web services-based storage to other applications in a manner that is transparent to those applications. For example, storage client 102 may be configured to integrate with an operating system or file system to provide storage in accordance with a suitable variant of the storage model described above. However, the operating system or file system may present a different storage interface to applications, such as a conventional file system hierarchy of files, directories, and/or folders.

In various embodiments, the communication network 104 may encompass any suitable combination of networking hardware and protocols necessary to establish Web-based communications between storage clients 102 and the Web service interface 108. For example, the communication network 104 may generally encompass the various telecommunications networks and service providers that collectively implement the Internet. The communication network 108 may also include private networks such as local area networks (LANs) or wide area networks (WANs) as well as public or private wireless networks. For example, both a given storage client 102 and the Web services interface 108 may be respectively provisioned within enterprises having their own internal networks. In such an embodiment, the communication network 104 may include the hardware (e.g., modems, routers, switches, load balancers, proxy servers, etc.) and software (e.g., protocol stacks, accounting software, firewall/security software, etc.) necessary to establish a networking link between given storage client 102 and the Internet as well as between the Internet and Web services interface 104. It is noted that in some embodiments, storage clients 102 may communicate with Web services interface 104 using a private network rather than the public Internet. For example, storage clients 102 may be provisioned within the same enterprise as the distributed storage network. In such a case, storage clients 102 may communicate with Web service interface 102 entirely through a private communication network 102.

Figure 2:
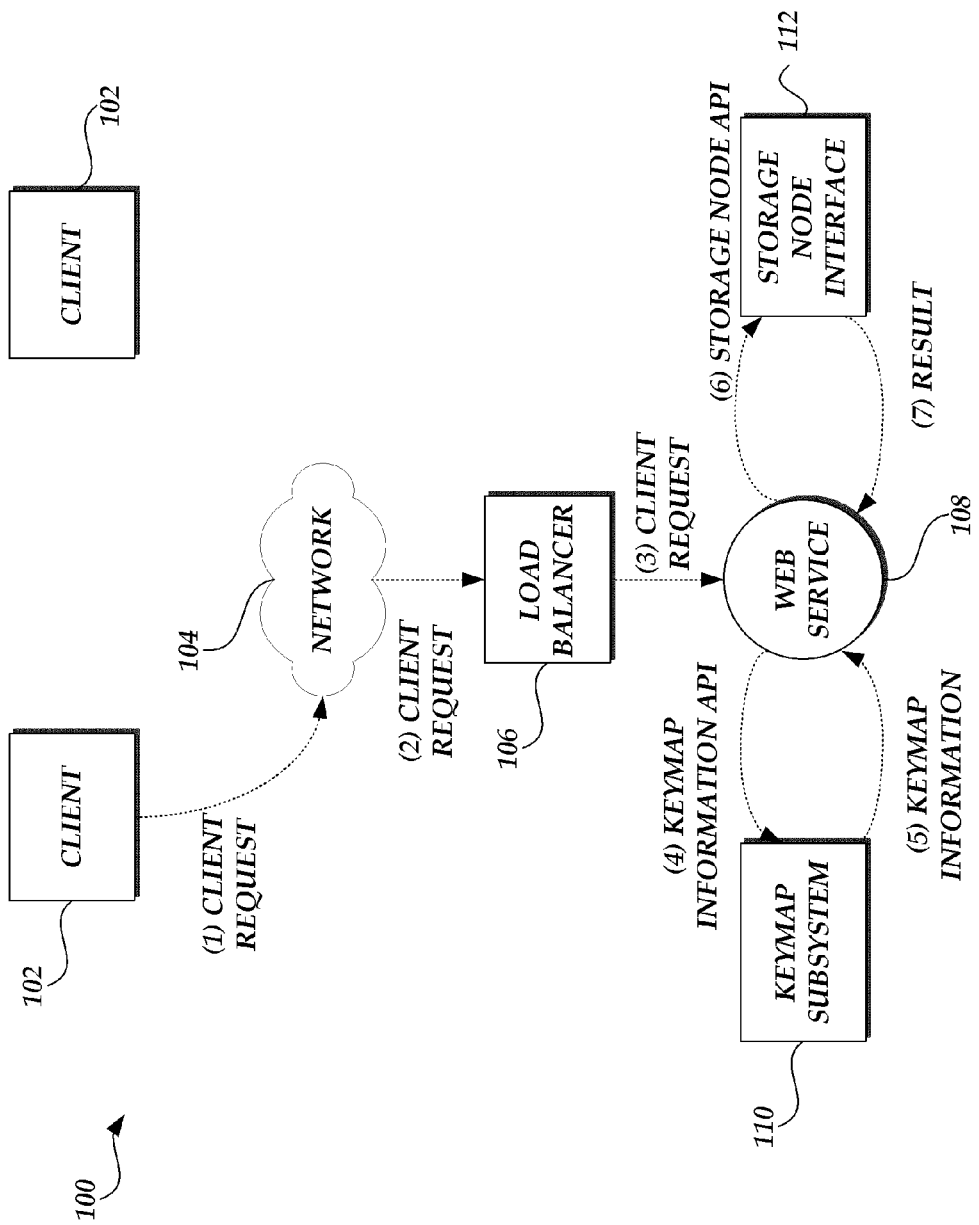
FIG. 2 is block diagram of the distributed storage network of FIG. 1 illustrating the processing of client requests corresponding to an object.

Turning now to FIG. 2, an illustrative embodiment illustrating the processing of storage client 102 requests corresponding to an object by the distributed storage network 100 will be described. As illustrated in FIG. 2, the storage client 102 generates a client request via the communication network 104. The client request is routed through a load balancing component 106 and is directed to an appropriate Web service interface component 108. Illustratively, the load balancing component can implement any one of a number of selection algorithms/components selecting an appropriate Web service interface component 108.

Upon receipt of a client request, the Web service interface 108 attempts to identify the object instances that correspond to the client request. Illustratively, the client request can correspond to requests to retrieve objects from the distributed storage network 100 or requests to add, modify, or delete objects from the distributed storage network. Examples of such requests were previously discussed with regard to GET and PUT instructions. Specifically, the Web service interface 108 obtains keymap information from the keymap subsystem 110. As previously discussed, each object can be represented by a key used to identify the object logically within the distributed storage network 100. As described above, the keymap information can correspond to a mapping of object keys to the locators of the instances of the object maintained with the distributed storage network 100. The Web service interface 108 can then utilize the keymap information from the keymap subsystem 110 to interface with the storage node interface 112 and identify the appropriate instances of the object that correspond to the storage client request.

Figure 3:
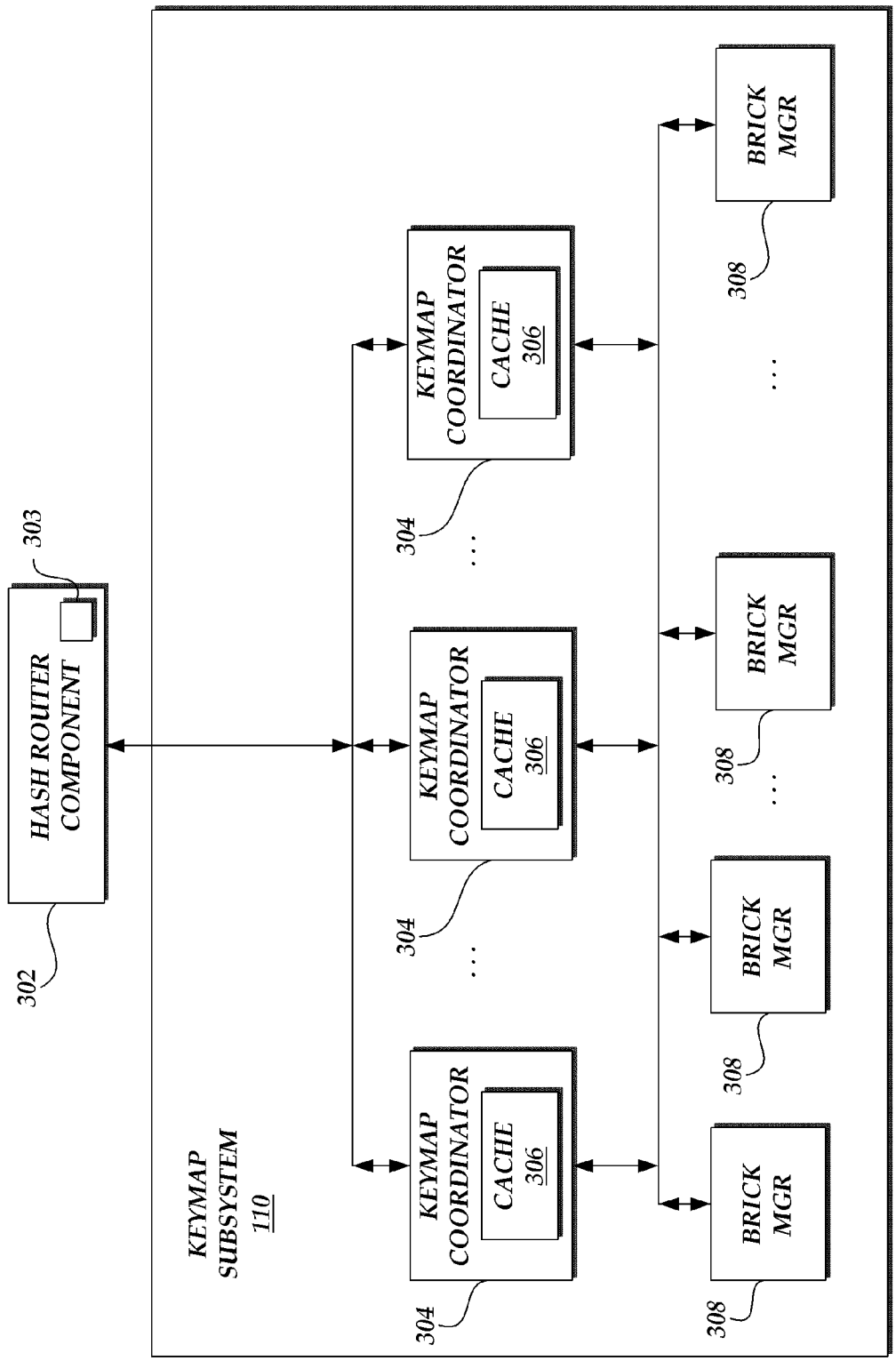
FIG. 3 is a block diagram illustrative of a keymap subsystem utilized in accordance with the distributed storage network of FIG. 1.

With reference now to FIG. 3, a block diagram illustrative of a keymap subsystem 110 utilized in accordance with the distributed storage network 100 of FIG. 1 to manage keymap information will be described. The keymap subsystem 110 includes a number of keymap coordinators 304 that correspond to a management tier of the keymap subsystem 110 and are responsive to process requests associated keymap information. As will be described in greater detail, the keymap subsystem 110 communicates with one or more hash router components 302 for selecting, or otherwise identifying, which keymap coordinator 304 will process requests for keymap information for an identified key.

Illustratively, the hash router components 302 include, or are made up of, an interface component 303 for obtaining consistent hashing information that facilitates the identification of which keymap coordinators 304 have been assigned to process requests for specific keymap information. Although the hash router component 302 is illustrated as a stand alone component separate from the keymap subsystem 110, in an illustrative embodiment, the hash router component is implemented as a component with the distributed storage network 110, such as the Web service interface component 108 (FIG. 1). Alternatively, the hash router component 302 may be implemented in other components with the distributed storage network 100. Still further, one or more hash router components 302 may be implemented as stand alone components within the distributed storage network 100 and accessible by other components via interfaces, such as application protocol interfaces (APIs).

In one aspect, the keymap coordinators 304 may be associated with a keymap information cache component 306 for caching keymap information, which will also be explained in greater detail below. The keymap information cache component 306 may be implemented in one or more hardware components, such as internal memory, external memory, shared memory, etc. Accordingly, the keymap cache component 306 represents a logical cache maintained by each keymap coordinator 304, or shared between multiple keymap coordinators 304. Still further, as will be explained in greater detail below, the keymap cache component 306 can be logically considered as having separate cache components for various components (such as the brick manager components) regardless of whether the keymap cache component is implemented as a single cache or multiple caches. Accordingly, the logical implementation of each keymap cache component 306 does not need to match the physical implementation of such a keymap cache component within a keymap coordinator 304.

With continued reference to FIG. 3, the keymap subsystem 110 can include a plurality of brick manager components 308 for managing, or otherwise controlling, the storage of keymap information in one or more defined a storage data structures, generally referred to as "bricks." One or more bricks may be associated with partitions on physical storage devices. The allocation and communication with individual bricks to manage the storage of the keymap information is controlled through the brick managers 308. In an illustrative embodiment, the brick managers 308 also receive input/commands regarding keymap information from other components in the distributed storage network 100. Often, the inputs/commands received from the other components are independent of the keymap coordinators 304. Example of the other components include, but are not limited to, reconciler agent daemons or anti-entropy agents, replication agents, repair agents, diagnostic tools, and the like. Additionally, specific brick managers 308 may receive inputs/commands from multiple keymap coordinators 304. As will be explained in greater detail below, in some embodiments, multiple keymap coordinators and the other components may have the ability and authority to access and modify the keymap information. As applied to keymap coordinators 304, as will be explained in greater detail below, the brick manager components 308 function as the source of keymap information that is cached by the keymap coordinators. In such a function, the brick manager components 308, or manager components, can be referred to as keymap information sources.

Figure 4:
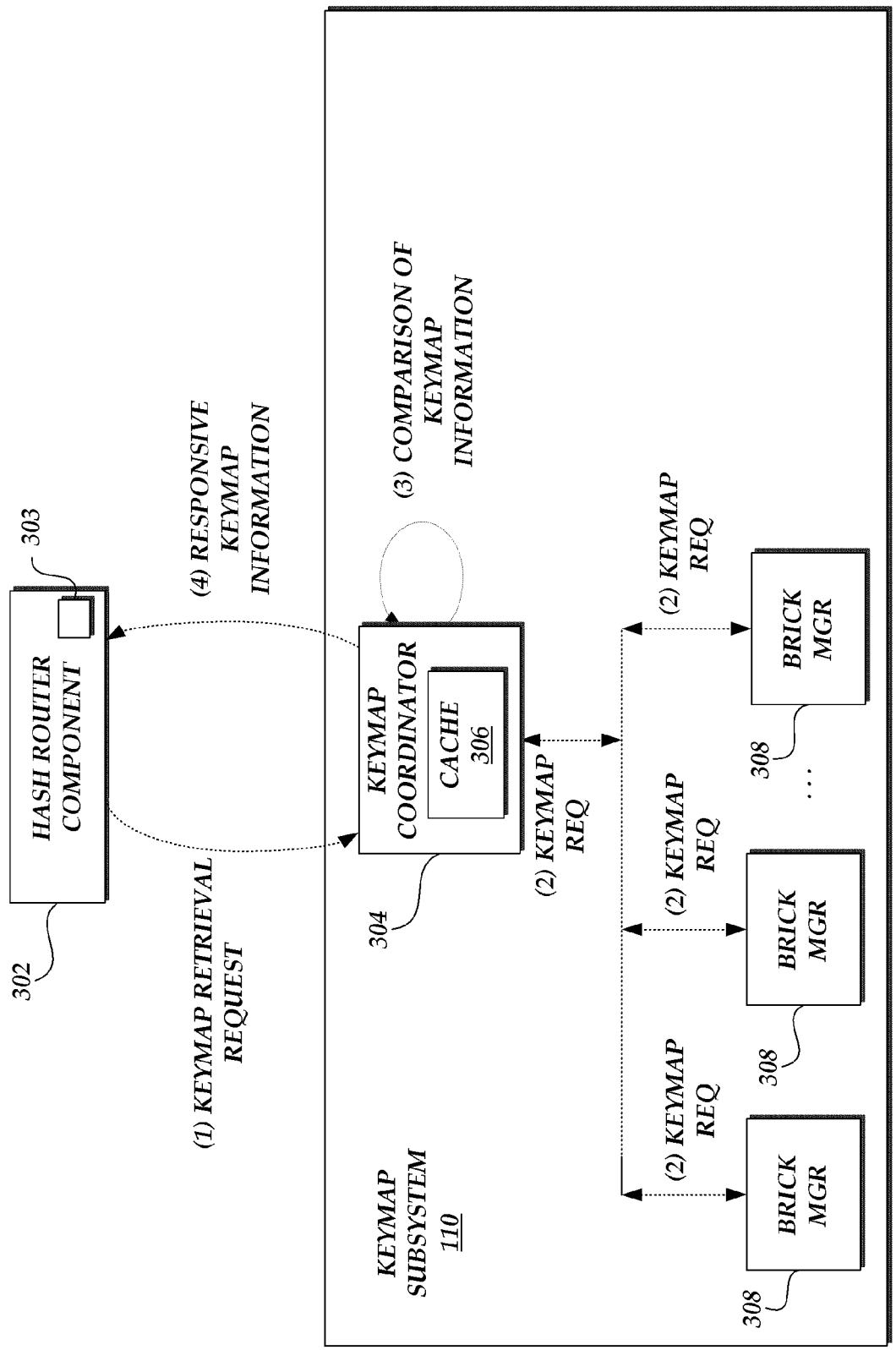
FIG. 4 is a block diagram of the keymap subsystem of FIG. 3 illustrating the processing of keymap information requests.

With reference now to FIG. 4, a block diagram of the keymap subsystem 110 illustrating the processing of keymap information requests will be described. As illustrated in FIG. 4, using a hash router component 302, a keymap information retrieval request is directed toward the specific keymap coordinator 304 associated with an identified object key. As will be explained in greater detail with regard to FIG. 5, in one embodiment, the hash router component 302 can utilize a consistent hash scheme for hashing object keys to generate a unique hash for each key. The possible hash values, or known hash values, may be subsequently allocated to each of the keymap coordinators 304 in the keymap subsystem 110 via the interface component 303. Accordingly, using the consistent hashing scheme, the hash router component 302 identifies which keymap coordinator 304 should be able to process the keymap information retrieval request.

With continued reference to FIG. 4, upon receipt of the keymap information retrieval request, the keymap coordinator 304 can issue requests for the keymap information from one or more brick managers 308. In an illustrative embodiment, the keymap coordinator 304 requests the keymap information from more than one brick manager for purposes of redundancy. In such an embodiment, the keymap coordinator 304 can require all the returned information to be consistent prior to returning the resulting keymap information. Alternatively, the keymap coordinator 304 can compare multiple versions of the keymap information and select one of the versions of the keymap information provided by the brick managers 308. For example, the keymap coordinator 304 can select the keymap information values that are in agreement with the majority of the polled brick managers, generally referred to as the quorum result. Based on the returned information, the keymap coordinator 304 returns responsive keymap information.

Figure 5:
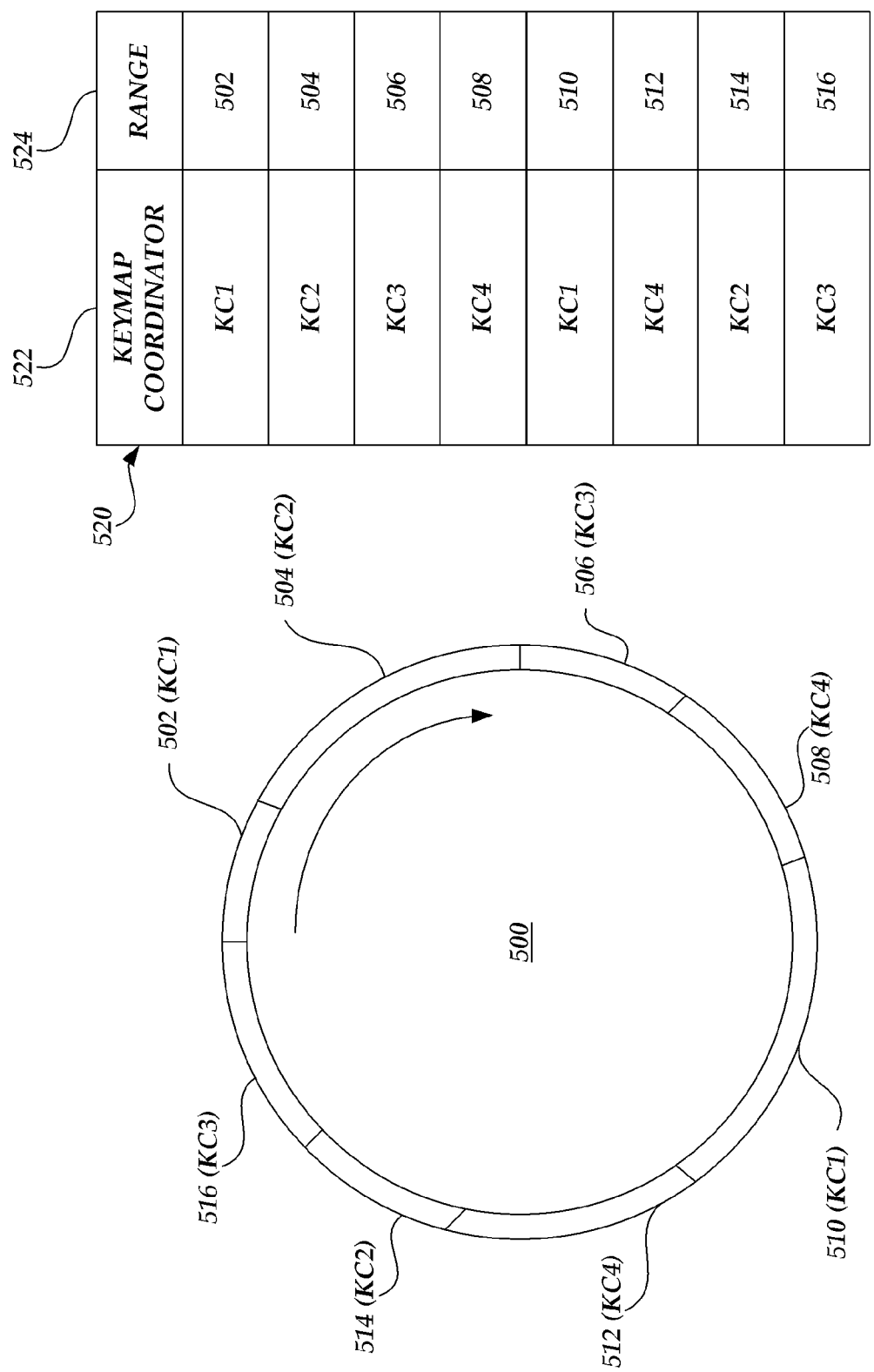
FIG. 5 is a block diagram illustrative of the selection of keymap coordinators from a keymap subsystem utilizing the consistent hashing of keymap information.

Turning now to FIG. 5, a block diagram illustrative of the selection of keymap coordinators 304 from a keymap subsystem 110 utilizing the consistent hashing of keymap information will be described. As previously described, the hash router component 302 can utilize a consistent hash scheme for hashing object keys to generate a unique hash for each key. The set of potential, or known hash values, can be represented as a ring 500. Additionally, the ring 500 of potential values can be further broken down into a set of hash value ranges 502, 504, 506, 508, 510, 512, 514, 516. Illustratively, the ranges defined for each keymap coordinator 304 may be of varied length. The determination of the length of each range may be based on a number of factors or additional criteria. Alternatively, the ranges may be of equal size.

With continued reference to FIG. 5, each of ranges in the ring 500 may be mapped to the keymap coordinators 304 in the keymap subsystem 110. In one embodiment, each keymap coordinator 304 may be associated with a single range with the ring 500. In another embodiment, keymap coordinators 304 may be associated with multiple ranges in the ring 500. Still further, each keymap coordinator 304 may be associated with the same number of ranges in the ring 500, generally referred to as multiplicity. Table 520 illustrates the assignment of ranges 502-516 in the ring 500 to keymap coordinators "KC1," "KC2," "KC3" and "KC4" in an illustrate keymap subsystem 110. As illustrated in columns 522 and 524 of the table 524, each keymap coordinator is associated with more than one range from the ring 500. Additionally, the assignment of ranges with the ring does not necessarily have to follow a consistent order or pattern. For example, the order of the assignment of ranges may be randomly selected or may be determined in accordance with various selection/processing criteria.

As previously described, in an illustrative embodiment, the hash router components 302 may be associated or otherwise found in a number of components with the distributed storage network 100. For example, the Web services interface 108 may include a hash router component 302 for directing requests to the appropriate keymap coordinator. In such an embodiment, individual copies of the table 524 may be maintained at each hash router component 302 via the interface component 303. The information associated with the definition of the hash ring ranges and assignments, as well as any other information associated with the selection of keymap coordinators 304 will be generally referred to as "hash routing information." Additionally, in an illustrative embodiment, the various hash router components 302 can utilize various protocols to update or propagate the hash ring 500 range information. For example, the distributed storage network 100 can utilize a peer-to-peer distribution communication protocol, such as a gossip protocol or epidemic protocol computer to computer communication protcol, to allow various components with the distributed storage network to maintain updated hash ring range information between the hash router components. In such an embodiment, each hash router component 302 would transmit and receive the hash routing information from other, known hash router components. Each hash router component 302 does not need to know about all possible hash router components 302 in the distributed storage network 100. Further, each hash router component 302 can process information from multiple hash router components to determine the most current version of the hash routing information. Accordingly, in this embodiment, the selection of an appropriate keymap coordinator can be implemented as a non-centralized process in which the hash routing information is updated within the distributed storage network 100.

As previously described, in accordance with aspects of the disclosure, the keymap coordinators 304 may implement a cache component 306 for maintaining keymap information. The cache component 306 may be a proxy cache that maintains keymap information (e.g., keymap values) for each of the brick managers associated with, or otherwise in communication with, the corresponding keymap coordinator 304. In such an embodiment, a keymap coordinator 304 may be able to utilize cached keymap information to response to a keymap retrieval request. In one aspect, the keymap coordinator 304 may utilize memory optimization techniques for maintaining keymap information for a plurality of brick manager components 308. In another aspect, the keymap coordinators 304 may utilize generation identifier information to manage the keymap information maintained in the cache component 306.

Figure 6:
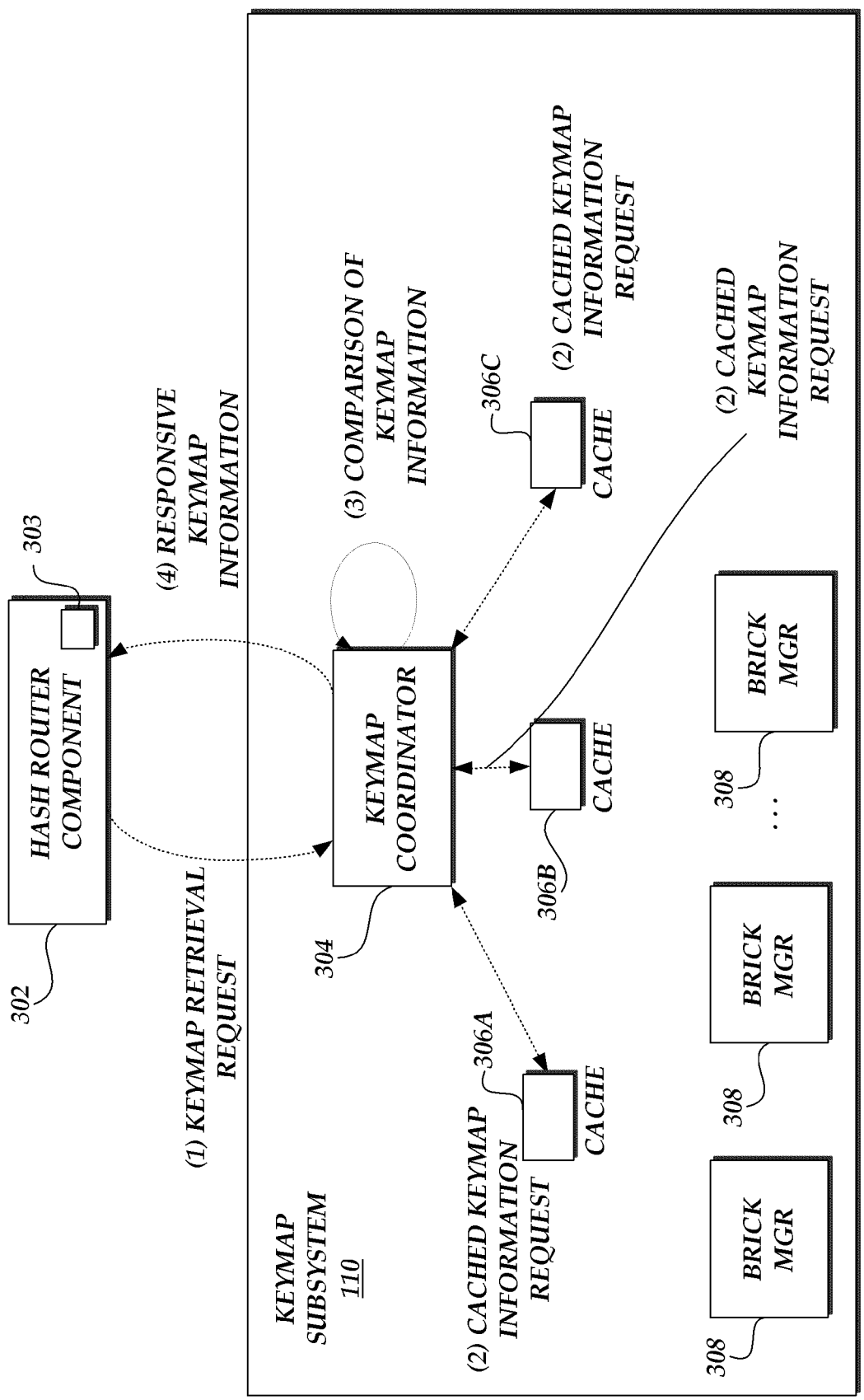
FIG. 6 is a block diagram of the keymap subsystem of FIG. 3 illustrating the processing of keymap information requests utilizing cached keymap information.

FIG. 6 is a block diagram of the keymap subsystem 110 of FIG. 3 illustrating the processing of keymap information requests utilizing cached keymap information. As illustrated in FIG. 6, similar to FIG. 4, the hash router component 302, using a hash router component 302, a keymap information retrieval request is directed toward the specific keymap coordinator 304 associated with an identified object key. The possible hash values, or known hash values, may be subsequently allocated to each of the keymap coordinators 304 in the keymap subsystem 110. Accordingly, using the consistent hashing scheme, the hash router component 302 identifies which keymap coordinator 304 should be able to process the keymap information retrieval request.

In the illustrative embodiment of FIG. 6, however, the keymap coordinator 308 can utilize cached keymap information maintained in the proxy caches 306A-306C for the comparison of keymap information. As illustrated in FIG. 6, the keymap coordinator 304 can logically maintain cached values for each of the brick managers 308. In an illustrative embodiment, the cached keymap information for each key can include information corresponding to the value of the keymap information, timing information identifying the last action associated with the keymap information, and a generation identifier associated with the key. Accordingly, in one embodiment, the cache component 306 can maintain cached keymap information for each brick manger that maintains the respective keymap information. For example, if a keymap coordinator 304 utilizes three brick manager components 308 to maintain the keymap information, the cache component 306 would maintain cached keymap information for each of the brick manager components 308, as described below.

In an alternative embodiment, the keymap coordinator 304 may optimize the amount of keymap information maintained in the cache component by maintaining a single version/value of the keymap information in the cache component 306. The single version/value of the keymap information may represent the most recent version of the keymap information by any of the brick manager components 308, as determined by timing information associated with keymap information, such as a timestamp. The single version/value may also represent the version/value associated with a quorum of the brick manager components. Additionally, the single version/value may also represent a version/value designated by the client 102 or the distributed storage network 100.

In the event that any brick manager components 308 are not currently storing the single version/value, the cache component 306 does not need to maintain separate values/versions. Instead, the cache component 306 can maintain indicators that specific brick manager components 308 have different values that will be used by the keymap coordinators 304 in assessing quorum, described below. Additionally, in an alternative embodiment, the cache component 306 may also maintain additional information that would allow the keymap coordinators 304, or other components, to generate different values from the cached single version/value. As applied to an embodiment implementing a quorum analysis to determine keymap information to return subject to a read request, the keymap coordinator 304 can determine a number of brick manager components associated with the single version/value and the number of brick managers associated with a different value. Accordingly, quorum for the single version/value can be determined if the number of brick managers 308 associated with single version/value exceeds the number of brick managers associated with a different version/value. In a further embodiment, the keymap coordinator 304 may initiate a repair function within the keymap subsystem 110 for any brick manager components 308 associated with a different value than the single version/value, such as an out of band request to synchronize the brick managers.

In another aspect and as will be explained in greater detail below, the keymap coordinators 304 can utilize one or more generation identifiers to determine whether the cached values in the cache component 306 can be considered to be valid. Specifically, so long as the keymap coordinator 304 is considered to be the last component to update a value within the assigned range of the ring (e.g., the last component to update keymap information corresponding to an assigned range), the keymap coordinator 304 may utilized the cached values to respond to keymap information retrieval requests. Alternatively, if the keymap coordinator 304 is not the last component to update a value within the assigned range, the cached values will not be considered valid and the keymap coordinator 304 will be required to obtain updated information from one or more of the brick managers 308.

In this illustrative embodiment, the keymap coordinator 304 will update the entire cache in the event that it is determined that another component has updated a relevant portion of the keymap information for at least one key. Alternatively, the keymap coordinator 304 may have the ability to update only a portion of the cache based on a determination of updated keymap information, such as by type. Still further, in one embodiment, the keymap coordinator 304 may be able update the portion of the cache 306 that corresponds to each individual brick manager 308. Alternatively, the keymap coordinator 304 may have to update the entire cache corresponding to all brick managers 308.

Figure 7:
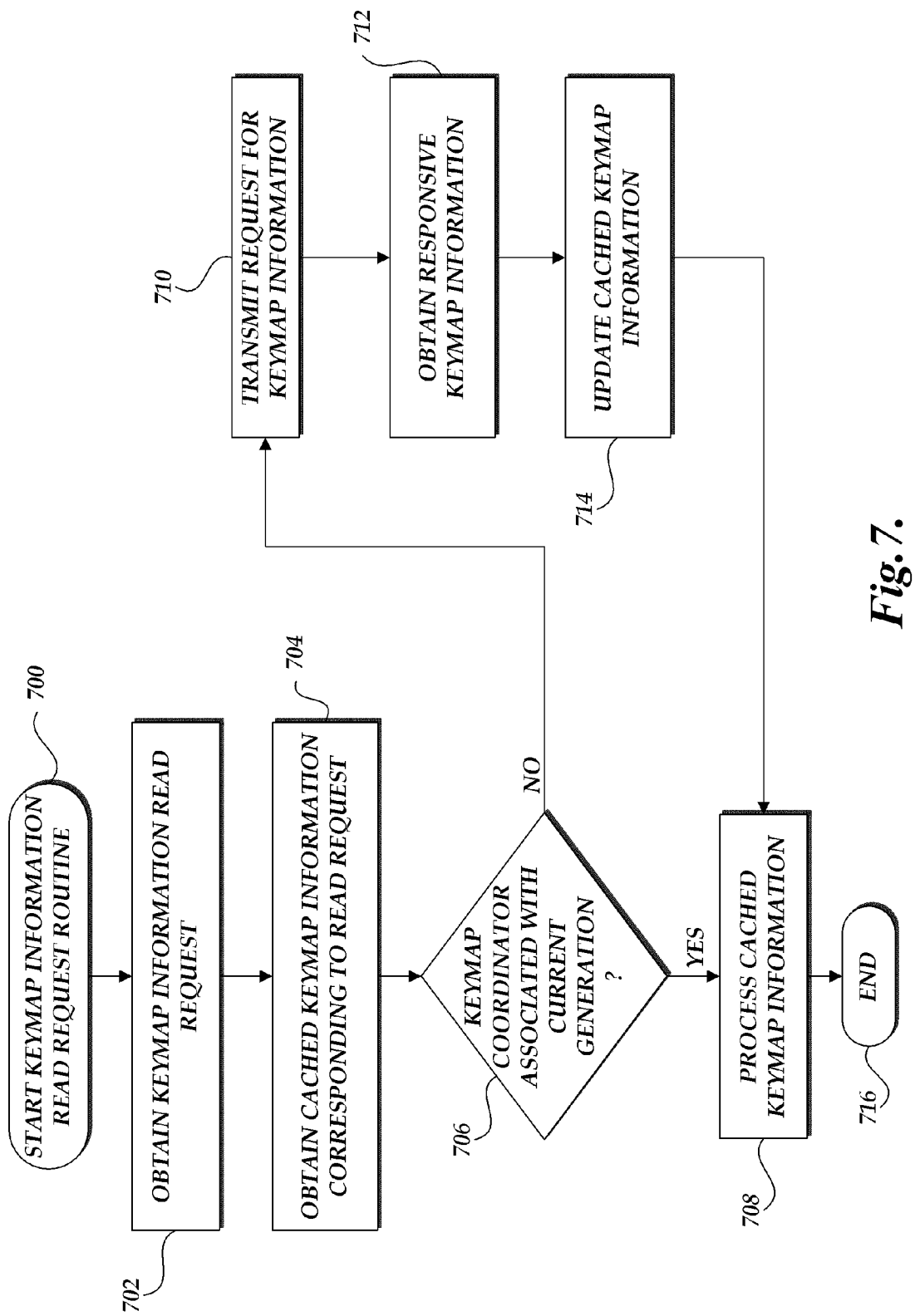
FIG. 7 is a flow diagram illustrative of a keymap information read request processing routine implemented by a keymap subsystem.

Turning now to FIG. 7, a flow diagram illustrative of a keymap information read request processing routine 700 implemented by a keymap subsystem 110 will be described. Routine 700 may be implemented by a keymap coordinator 304 to determine whether cached values for keymap information maintained by a single brick manager component 308 may be utilized. As mentioned above, in an illustrative embodiment, the keymap coordinator 304 can utilize cached values for the keymap information so long no other component (e.g., an administrative component or another keymap coordinator 304) has updated any of keymap information maintained by the brick managers. Although routine 700 is described with regard to cached keymap information maintained by a single brick manager component, in an illustrative embodiment, routine 700 may implemented by the keymap subsystem 110 multiple times in the event that multiple cached values are maintained by a keymap coordinator 304 and considered for purposes of a quorum based analysis.

With reference now to FIG. 7, at block 702, the keymap coordinator 304 obtains a keymap information read request. As previously discussed, in an illustrative embodiment, the keymap information read request can correspond to a GET command. At block 704, the keymap coordinator 304 obtains any cached keymap information corresponding to the read request. As previously described, in an illustrative embodiment, the cached keymap information for each key can include information corresponding to the value of the keymap information, timing information identifying the last action associated with the keymap information, and a generation identifier associated with the key. The cached keymap information may include cached keymap information for each of a plurality of brick manager components 208. Alternatively, the cached keymap information can correspond to keymap information representative of values for multiple brick manager components 208.

At decision block 706, the keymap coordinator 304 determines whether the generation identifier associated with the cached keymap information is associated with the specific keymap coordinator 304. In an illustrative embodiment, the brick manager 308 maintains a table of current owners of assigned ranges of hashed values, similar to the ranges identified in FIG. 5. Specifically, the table of current owners associated a generation identifier, such as a GUID or other identifier, based on the component in the keymap subsystem 110 or distributed storage network 100 that last made an edit to the keymap information associated with any hash value in the assigned range. The identifier can be generally referred to as a generation identifier. In an illustrative embodiment, each time a value is updated by a component associated with the current generation identifier, the table remains unchanged because the same component continues to be the most recent controller/owner of the information. However, if a value in the assigned range is updated by a different component, a new generation identifier corresponding to the different component is generated. The new generation identifier is then associated in the table by the brick manager component 308 and transmitted to keymap coordinators 304.

With continued reference to FIG. 7, if the keymap coordinator 304 obtains an identification of a generation identifier that has been assigned, or otherwise associated with, to the keymap coordinator, the keymap coordinator assumes that the cached value is valid. Accordingly, at block 708, the keymap coordinator 304 processes the cached keymap information for servicing the read request and the routine 700 terminates at block 716. Alternatively, if the keymap coordinator obtains an identification of a generation identifier that has not been assigned to the keymap coordinator, the keymap coordinator 304 assumes that the cached values are no longer valid. At block 710, the keymap coordinator 304 transmits a request to the brick managers 308 for updated keymap information. At block 712, the keymap coordinator 304 obtains the responsive keymap information from the brick managers. At block 714, the keymap coordinator 304 updates the cached keymap information. The routine 700 proceeds to block 708 where the keymap coordinator 304 processes the cached keymap information for servicing the read request. In one embodiment in which a keymap coordinator 304 utilizes cached keymap information from a single brick manager 308, the keymap coordinator may return the return the cached keymap information responsive to the read request. In another embodiment in which a keymap coordinator 304 utilizes cached keymap information from multiple brick managers 308, the keymap coordinator utilizes, or otherwise incorporates, the specific cached keymap information in consider of additional cached keymap information associated with other brick managers. For example, the keymap coordinator 304 can utilize the cached keymap information as part of quorum analysis to determine which cached information to return. The routine 700 terminates at block 716.

Figure 8:
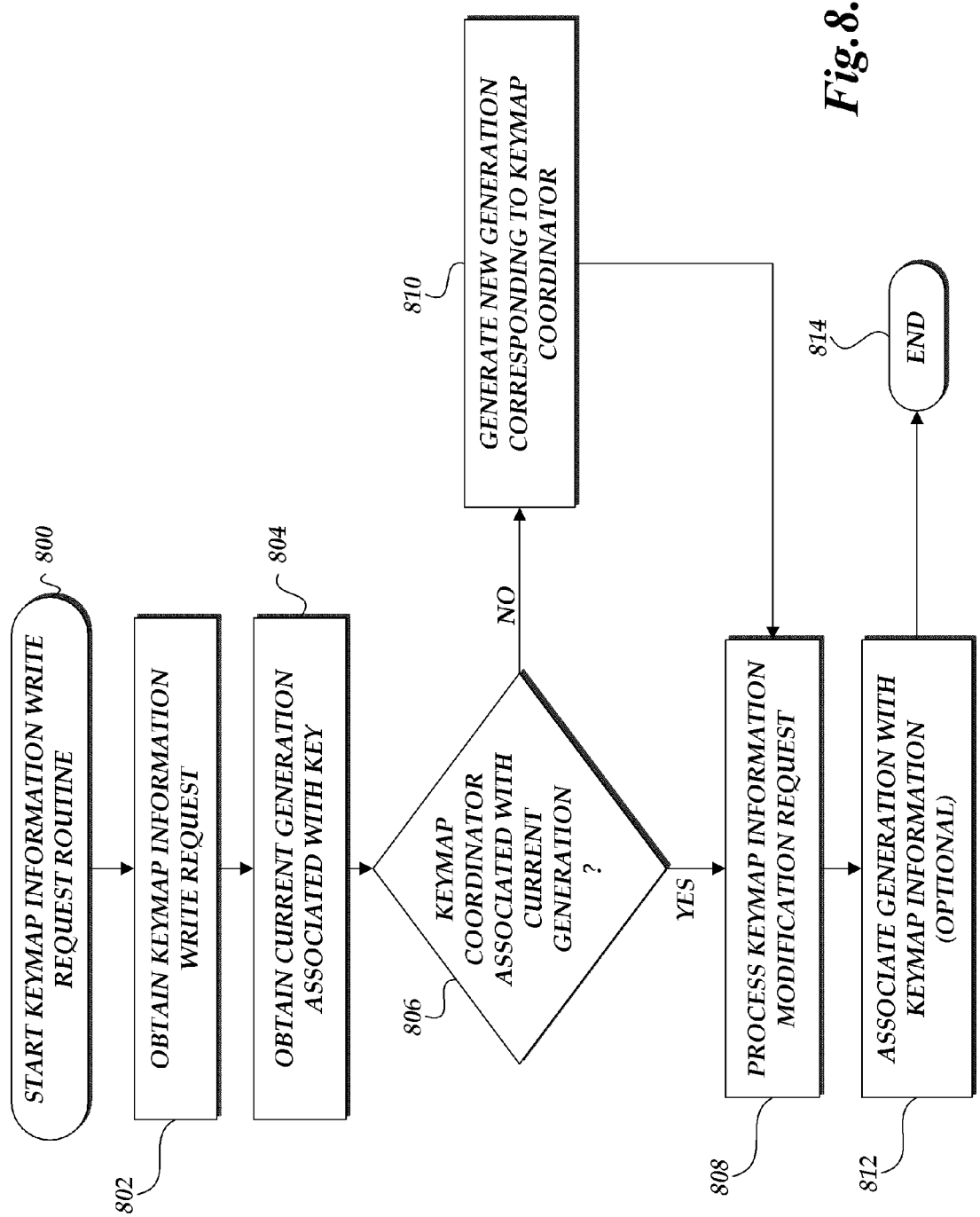
FIG. 8 is a flow diagram illustrative of a keymap information write request processing routine implemented by a keymap subsystem.
Figure 9:
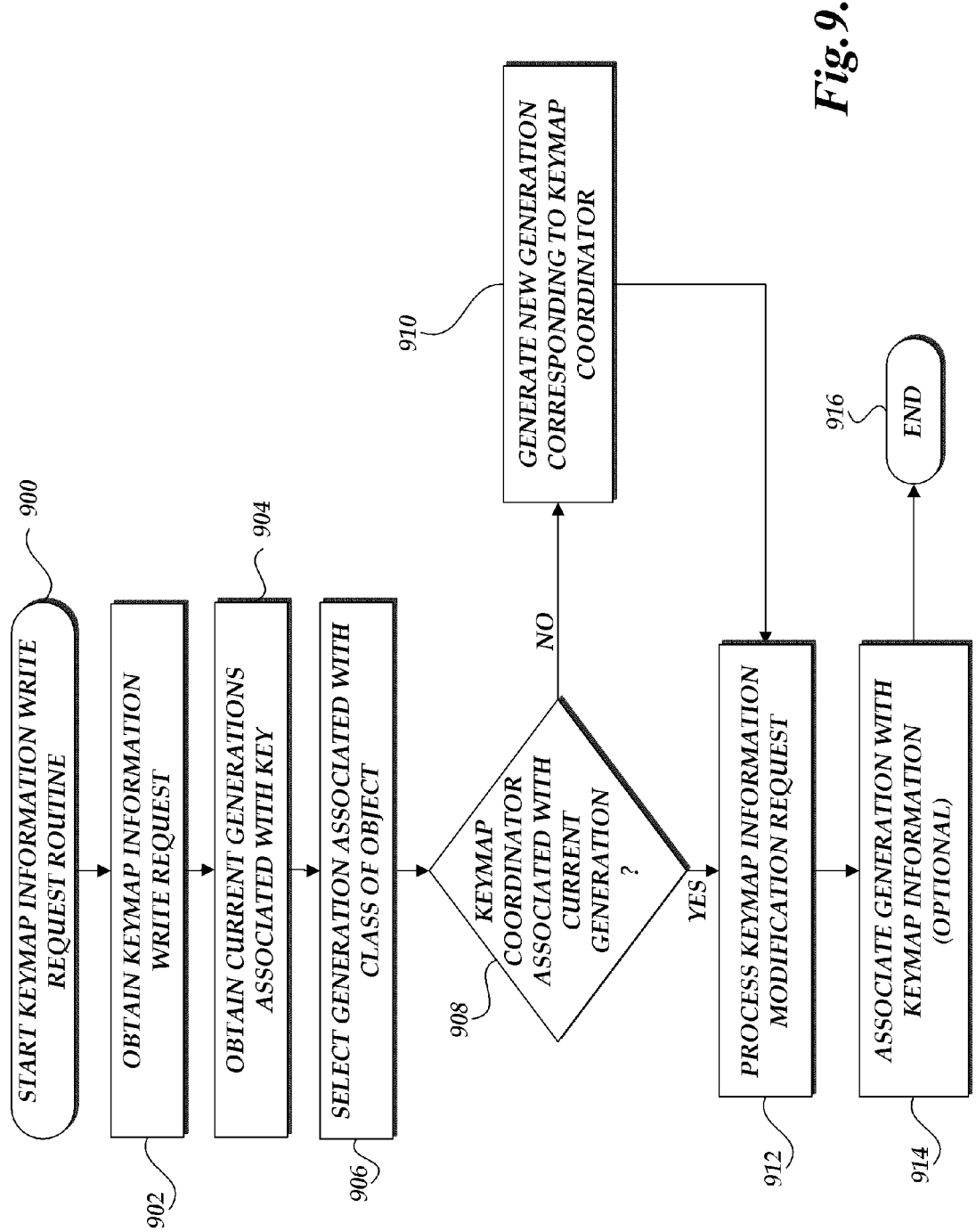
FIG. 9 is a flow diagram illustrative of a keymap information write request processing routine utilizing multiple generations and implemented by a keymap subsystem.

With reference to FIGS. 8 and 9, in an illustrative embodiment, the brick manager components 308 can utilize the concept of data ownership, through the utilization of generation identifiers, to assist the keymap coordinators 304 in determining whether to refresh cached values for the cached keymap information. One potential approach to managing cached values utilizes concepts of expiration data, or time to live, in which cached values are considered to be no longer valid and requires refreshing of the cached value. If the expiration data is set to a lower value/parameter, the cached values may be refreshed unnecessarily and the refresh wastes distributed storage network resources. If the expiration data is to a higher value/parameter, the cached values may become stale (based on updates/changes) and the keymap coordinator 304 risks utilizing incorrect values. In accordance with an embodiment implementing generation data for each key, the keymap coordinator 304 attempts to refresh the cached keymap information only when it is assumed that an underlying portion of the keymap information has changed.

Referring now to FIG. 8, a flow diagram illustrative of a keymap information write request processing routine 800 implemented by a keymap subsystem 110 will be described. Specifically, routine 800 can be implemented by a brick manager component 308 of the keymap subsystem 110 to facilitate the management of cached keymap information. At block 802, the brick manager component 308 obtains a request corresponding to an identified key. For example, the request can include information retrieval request (e.g., GET requests), information modification requests (e.g., PUT requests), or other types of requests. Illustratively, the request is transmitted, or otherwise associated with, a specific keymap coordinator 304. However, the request may be received by the brick manager 308 from any component, referred to generally as a "caller," for processing.

At block 804, the brick manager component 308 obtains a current generation associated with the key, generally referred to as the current generation information. As discussed above, the generation identifier represents a unique identifier, such as a GUID, that is used to identify a particular component or role with the distributed storage network 100. A new generation identifier is generated and assigned each time a different component of the distributed storage network 100 makes a modification to the stored keymap information. However, a current generation identifier is maintained if modifications to stored keymap information are initiated by the same component associated with a current generation identifier. For example, multiple modifications of the keymap information by the same component (e.g., the keymap coordinator 304) will not result in the generation of a new generation identifier because the same entity has made the modifications. In contrast, the modification of keymap information previously associated with a generation identifier corresponding to a keymap coordinator 304 by an administrative component, such as a reconciler, or another keymap coordinator 304 in the distributed storage network 100 would result in a new generation identifier. Likewise, a subsequent update of the modified keymap information by the keymap coordinator 304 would result in the generation of a new generation identifier and accordingly, an update of the current generation information.

At decision block 806, a test is conducted to determine whether the keymap coordinator 304 associated with the request received by the brick manager component 308 corresponds to the current generation identifier associated with the key identified the obtained request. As previously discussed, the brick manager component 308 can obtain the current generation identifier from the current generation identification information. If the brick manager component 308 identifies a generation identifier that has been assigned, or otherwise associated with, to the requesting keymap coordinator 304, the brick manager component 308 assumes that the cached value is the most current value and that no other components have updated the cached keymap information. Accordingly, at block 808, the brick manager component 308 processes the request and attempts to modify the keymap information in accordance with the request transmitted by the keymap coordinator 304. Alternatively, if the keymap coordinator obtains an identification of a generation identifier that has not been assigned to the requesting keymap coordinator 304, the brick manager component 308 assumes that another component has made modifications to at least one of the records associated with the generation identifier. Accordingly, at block 810, the brick manager component 308 generates a new generation identifier corresponding to the keymap coordinator 304. The routine 800 proceeds to block 808 in which the brick manager component 308 attempts to process the write request, described above.

With continued reference to FIG. 8, at block 812, the brick manager component 308 can update the information with the updated generation information. In one embodiment, the brick manager component 308 can update the table information of ranges to generation identifiers and propagate the information to one or more keymap coordinators 304. In alternative embodiment, in the event that the brick manager component 308 did not generate a new generation identifier, block 812 may be omitted. Alternatively, the brick manager component 308 can update the generation information even if the information has not changed. The routine 800 terminates at block 814.

In an illustrative embodiment, the utilization a single generation identifier (e.g., GUID) for an entire range of cached keymap information can result in the invalidation of the cache in the event a single entry in the cached keymap information is updated, created or deleted by any other component in the distributed storage network 100. With regard to updates to existing entries in cache, in one embodiment, the keymap coordinator 304 does not manage individual entries in the cache. Instead, the keymap coordinator 304 may consider all cached keymap information as no longer valid (e.g., "stale"), without verification of whether any, or all, such values are in fact no longer valid. In some instances, however, certain classes of cached keymap information may have no relation to other classes of cached keymap information. In such instances, the modification of any cached keymap information from one class of cached keymap information should not affect any cached keymap information associated with other classes. For example, with regard to the deletion of previous cached keymap information, the cache component 306 may maintain legacy information, often referred to as "tombstones" that corresponded to the previous entries. Accordingly, modification of a tombstone value (or the addition/ deletion) would not necessarily result in a modification active/existing entries. Accordingly, in an illustrative embodiment, the brick manager component 308 can implement multiple generation identifiers representative of classes of cached keymap information such that modification of cached information associated with a class as specified by a first generation identifier does not have an influence of the validity of entries corresponding to another class as specified by a separate generation identifier.

Referring now to FIG. 9, a flow diagram illustrative of a keymap information write request processing routine 900 utilizing multiple generation identifiers and implemented by a keymap subsystem 110 will be described. Similar to routine 800, routine 900 can be implemented by a brick manager component 308 of the keymap subsystem 110 to facilitate the management of cached keymap information. At block 902, the brick manager component 308 obtains a request corresponding to an identified key. For example, the request can include information retrieval request (e.g., GET requests), information modification requests (e.g., PUT requests), or other types of requests. Illustratively, the request is transmitted, or otherwise associated with, a specific keymap coordinator 304. At block 904, the brick manager component 308 obtains a current generation associated with the key from the current generation information (described generally above). As stated above, the generation information represents a unique identifier, such as a GUID or other identifier, that is used to identify a particular component or role with the distributed storage network 100. In this embodiment, cached keymap information may have multiple generation identifiers in which each generation identifier corresponds to a class of data. The cached keymap information may be limited to being associated with only one type of generation identifier. Alternatively, depending on the classes, cached keymap information may be associated with multiple generation identifiers.

At block 906, the brick manager component 308 determines, or selects, which generation is associated with the request. As discussed above, in this embodiment, the cached keymap information may be associated with multiple generation identifiers based on classes or attributes of data. Specifically, the brick manager component 308 may from multiple generation identifiers based on the type of data that is cached or according to the specifics of the write request. For example, if cached keymap information corresponds to multiple classes of data, but the received write request is only attempting to modify a portion of the cached data, the brick manager component 308 may select the generation identifier corresponding to the affected class.

At decision block 908, a test is conducted to determine whether keymap coordinator 304 associated with the request received by the brick manager component 308 corresponds to the selected, current generation identifier associated with the key identified the obtained request. As previously discussed, the brick manager component 308 can obtain the current generation identifier from the current generation identification information. If the brick manager component 308 identifies a generation identifier that has been assigned, or otherwise associated with, to the requesting keymap coordinator 304, the brick manager component 308 assumes that the cached value is the most current value and that no other components have updated the cached keymap information. Accordingly, at block 912, the brick manager component 308 processes the request and attempts to modify the keymap information in accordance with the request transmitted by the keymap coordinator 304. Alternatively, if the keymap coordinator obtains an identification of a generation identifier that has not been assigned to the requesting keymap coordinator 304, the brick manager component 308 assumes that another component has made modifications to at least one of the records associated with the generation identifier. Accordingly, at block 910, the brick manager component 308 generates a new generation identifier corresponding to the keymap coordinator 304. The routine 900 proceeds to block 912 in which the brick manager component 308 attempts to process the write request, described above.

At block 914, the brick manager component 308 can update the information with the updated generation information. In one embodiment, the brick manager component 308 can update the table information of ranges to generation identifiers and propagate the information to one or more keymap coordinators 304. In alternative embodiment, in the event that the brick manager component 308 did not generate a new generation identifier, block 914 may be omitted. Alternatively, the brick manager component 308 can update the generation information even if the information has not changed. The routine 900 terminates at block 916.

Figure 10:
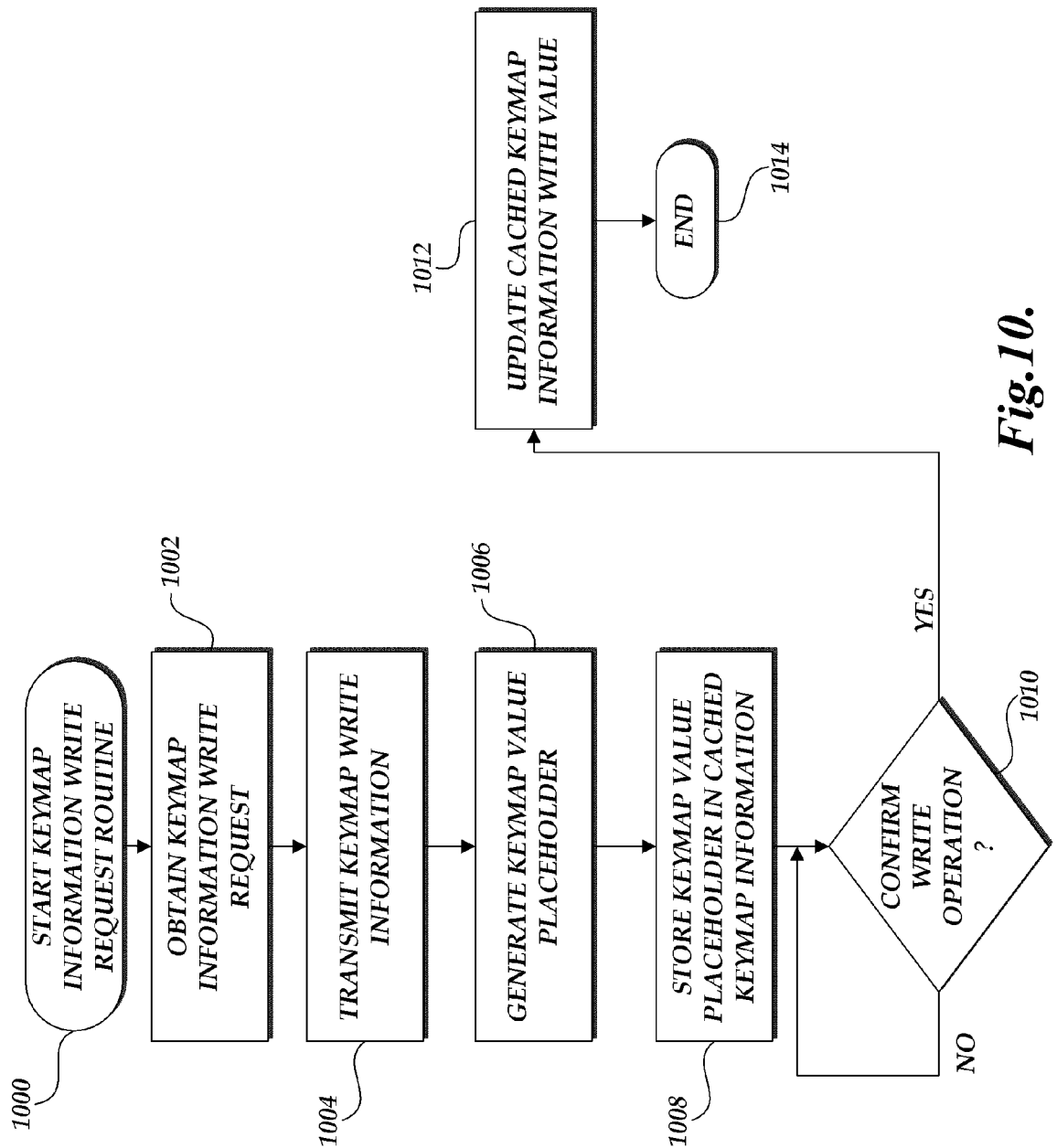
FIG. 10 is a flow diagram illustrative of a keymap information write request processing routine implemented by a keymap subsystem.
Figure 11:
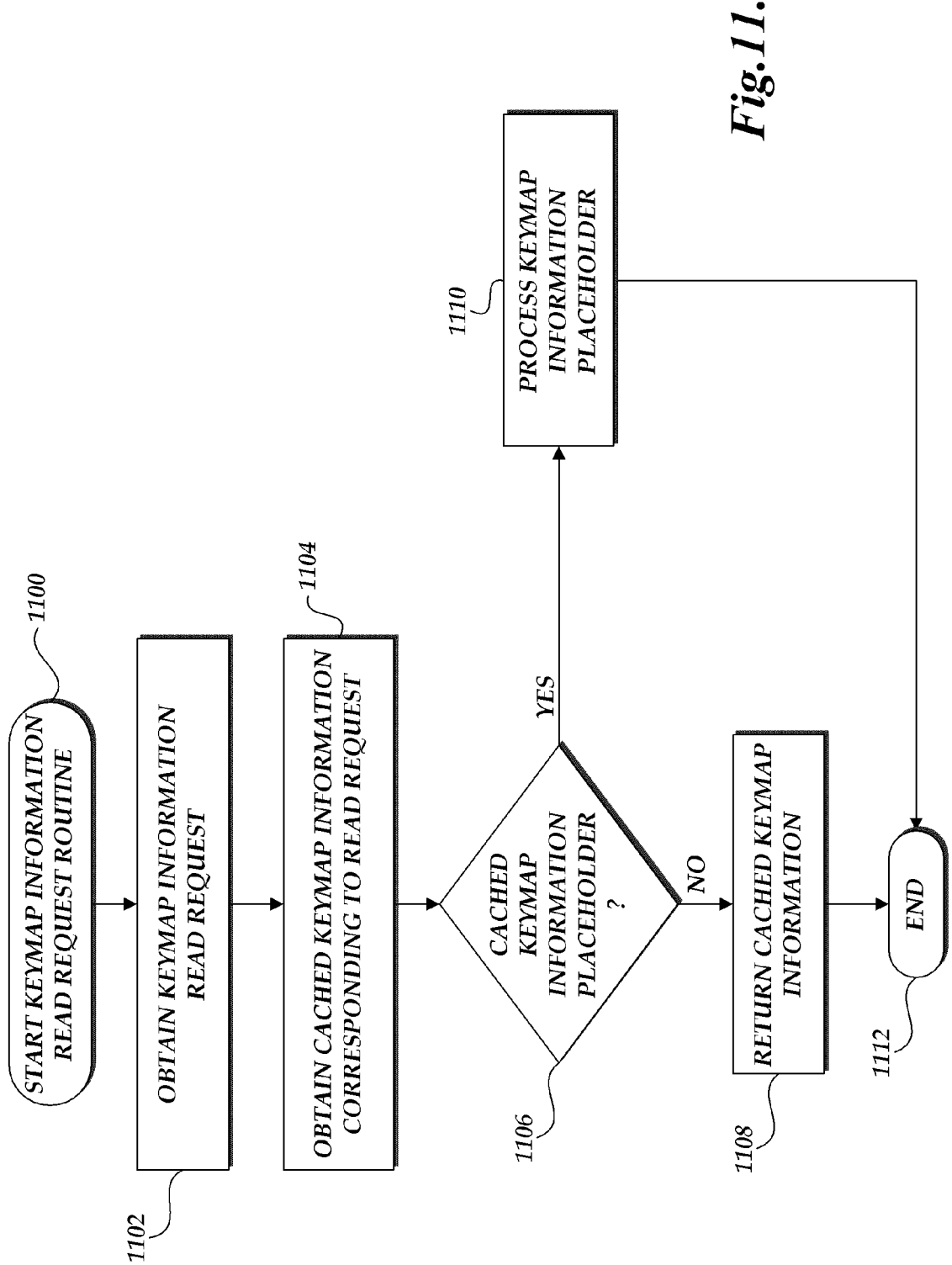
FIG. 11 is a flow diagram illustrative of a keymap information read request processing routine implemented by a keymap subsystem.

With reference to FIGS. 10 and 11, in another embodiment, the keymap coordinator 304 can utilize the concept of placeholders in the cached keymap information to facilitate a determination of whether to the cached values are subject to update. In accordance with this embodiment, a keymap coordinator 304 typically processes requests corresponding to keymap information in the order in which the requests are received. For example, if a request to write keymap information is received prior to a request to read keymap information, the keymap coordinator 304 will attempt to write the keymap information prior to processing the read request. However, in the event that order among multiple requests cannot be maintained, the keymap coordinator 304 is at risk of returning invalid data. With reference to the previous example, if the read request is executed prior to completion of the write request, the keymap coordinator 304 may return stale information. Accordingly, in an embodiment, the keymap coordinator 304 may utilize placeholder information within the cached keymap information to mitigate such errors. Similar to routine 700 (FIG. 7), Although routines 1000 and 1100 (FIGS. 10 and 11) will be described with regard to cached keymap information associated with a single brick manager component 308, in an illustrative embodiment, routines 1000 and 1100 may implemented by the keymap subsystem 110 multiple times in the event that multiple cached values are maintained by a keymap coordinator 304 and considered for purposes of a quorum based analysis.

With reference now to FIG. 10, a flow diagram illustrative of a keymap information write request processing routine 1000 implemented by a keymap subsystem 110 will be described. At block 1002, the keymap coordinator 304 obtains a request to write keymap information. As previously described, illustrative keymap write requests correspond to requests to create new keymap information, modify existing keymap information and delete existing keymap information. At block 1004, the keymap coordinator 304 transmits the request to modify the keymap information to a corresponding brick manager 308. At block 1006, the keymap coordinator 304 generates a keymap value placeholder, such as a null pointer or other known value.

At block 1008, the keymap coordinator 304 stores the keymap value placeholder in cached keymap information. At block 1010, the keymap coordinator 304 determines whether the write has been confirmed by the corresponding brick manager 308. If the write has not been confirmed, the routine 1000 remains at decision block 1010. Alternatively, once the write process has been confirmed by the brick manager 308, the keymap coordinator 304 updates the cache with the value corresponding to the write command at block 1012. The routine 1000 terminates at block 1014. As described above, by replacing the previous value of the cached keymap information with the placeholder, the keymap coordinator 304 mitigates errors associated with receiving read requests by the keymap coordinator 304 prior to receipt of the confirmation of the write request at decision block 1010.

With reference now to FIG. 11, a flow diagram illustrative of a keymap information read request processing routine 1100 implemented by a keymap subsystem 110 will be described. Routine 1100 may be implemented when the keymap coordinator 304 has utilized keymap information placeholders after receiving a write request. At block 1102, the keymap coordinator 304 obtains a keymap information read request. In an attempt to utilize cached keymap information, the keymap coordinator 304 obtains the current cached keymap information from a corresponding cache 306 at block 1104. At decision block 1106, a test is conducted to determine whether cached keymap information corresponds to a keymap information placeholder. If the cached keymap information does not correspond to a keymap information placeholder, the keymap coordinator 304 can return the cached keymap information or make further analysis, such as for generation identifiers. The routine 1100 then terminates at block 1112.

Alternatively, if the cached keymap information corresponds to a keymap information placeholder, at block 1110, the keymap coordinator 304 processes the keymap information placeholder. In one embodiment, the keymap coordinator 304 may wait for a period of time to determine whether the previous processing of the write command (as illustrated in FIG. 10) can be completed and the keymap coordinator 304 can update the keymap information placeholder with an updated value. If the keymap coordinator 304 can obtain the updated value, the updated value will be processed as the cached value. In another embodiment, the keymap coordinator 304 considers the keymap information placeholder invalid and indicates that the cache is invalid and needs to be refreshed. For example, if the keymap coordinator 304 has waited more than a specific period of time, the keymap information placeholder may be ignored. Still further, in another embodiment, the keymap coordinator 304 may also request an immediate refresh of the entire cached keymap information in the event that keymap information placeholder is found.

With continued reference to FIG. 11, the keymap coordinator 304 may utilize timing information such that timing information (e.g., timestamps) associated with the keymap information placeholder is used to determine the relative staleness of the write request or the returned keymap information. Accordingly, in one example, the keymap coordinator 304 can ignore stale write requests based on timing information. In another example, the keymap coordinator 304 can ignore returned information if the timing information associated with the returned information is earlier than the timing information associated with the write request. In such an example, the returned information can be considered to not be reflective of the submitted write request.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing objects stored in a distributed storage system comprising:
   at least one computing device, having a processor and a memory, the at least one computing device implementing:
      a service interface component for managing requests associated with objects maintained by the distributed storage system;
      a keymap subsystem, the keymap subsystem obtaining requests for keymap information, wherein the keymap information corresponds to a mapping of a key associated with an object with one or more identifiers of instances of the object on the distributed storage system, the keymap subsystem including:
         one or more keymap coordinators for processing requests associated with object keys; and
         one or more managers for maintaining the keymap information;
         one or more consistent based hash routing components for generating a consistent based hashing scheme,
         wherein the consistent based hashing scheme corresponds to an assignment of object keys to active keymap coordinators of the one or more keymap coordinators,
         wherein each active keymap coordinator is assigned a portion of the object keys based at least in part on a hash value of each object key within the assigned portion, and
         wherein the consistent based hashing scheme is updated between each of the one or more consistent based hash routing components in accordance with a peer-to-peer distribution model; and
      a storage node interface for interfacing with one or more storage nodes associated with the distributed storage system.

2. The system as recited in claim 1, wherein the one or more consistent based hashing components utilize a gossip protocol to update the consistent based hashing scheme.

3. The system as recited in claim 1, wherein the consistent based hashing scheme corresponds to a multiplicity based consistent based hashing scheme in which each of the one or more keymap coordinators are assigned an equal number of ranges of hash values.

4. The system as recited in claim 1, wherein the one more consistent based hash routing component are integrated with other components.

5. The system as recited in claim 1, wherein the peer-to-peer distribution model corresponds to the incorporation of a gossip protocol to update the consistent based hashing scheme.

6. A system for managing objects stored in a distributed storage system comprising:
   at least one computing device, having a processor and a memory, the at least one computing device implementing:
      one or more keymap coordinators for processing requests for keymap information associated with object keys, wherein the keymap information corresponds to a mapping of a key associated with an object with one or more identifiers of instances of the object on the storage network;
      one or more consistent based hash routing components for generating a consistent based hashing scheme assigning the one or more keymap coordinators to ranges of hash values derived from object keys,
         wherein the consistent based hashing scheme corresponds to an assignment of object keys to active keymap coordinators of the one or more keymap coordinators,
         wherein each active keymap coordinator is assigned a portion of the object keys based at least in part on a hash value of each object key within the assigned portion of the object keys, and
         wherein the consistent based hashing scheme is updated between each of the one or more consistent based hash routing components in accordance with a peer-to-peer distribution model; and
      one or more managers for maintaining the keymap information.

7. The system as recited in claim 6, wherein the consistent based hashing scheme corresponds to multiplicity based consistent based hashing scheme in which each of the one or more keymap coordinators are assigned an equal number of ranges of hash values.

8. The system as recited in claim 6, wherein the one more consistent based hashing component are integrated with other components.

9. The system as recited in claim 6, wherein the one or more managers correspond to a brick manager for maintained keymap information.

10. The system as recited in claim 6, wherein each range of the hash values within each assigned portion of the object keys is equal.

11. The system as recited in claim 6, wherein each range of the hash values within each assigned portion of the object keys is nonequal.

12. A method for managing objects stored in a distributed storage system comprising:
   obtaining a request for modifying keymap information associated with an object, the keymap information corresponds to a mapping of a key associated with an object with one or more identifiers of instances of the object on the distributed storage system, the request identifying a key associated with the object;
   selecting a keymap coordinator from one or more keymap coordinators in accordance a consistent based hashing scheme and based on a hash value of the key associated with the object,
      wherein the consistent based hashing scheme corresponds to an assignment of object keys to the one or more keymap coordinators, and
      wherein each keymap coordinator is assigned a portion of the object keys based at least in part on a hash value of each object key within the assigned portion;
   causing transmission of the request to the selected keymap coordinator; and
   transmitting information corresponding to the consistent based hashing scheme to at least one additional component in the distributed storage system in accordance with a distribution model identifying less than all possible recipients in the distributed storage system.

13. The method as recited in claim 12, wherein transmitting consistent based hashing information corresponds to transmitting consistent based hash information utilizing a peer-to-peer distribution model.

14. The method as recited in claim 12, wherein transmitting consistent based hashing information corresponds to transmitting consistent based hash information utilizing a gossip protocol.

15. The method as recited in claim 12, wherein each range of the hash values within each assigned portion of the object keys is equal.

16. The method as recited in claim 12, wherein each range of the hash values within each assigned portion of the object keys is nonequal.

17. A method for managing objects stored in a distributed storage system comprising:

obtaining consistent based hashing scheme data in accordance with a distribution model identifying less than all possible recipients in the distributed storage system;

updating a stored consistent based hashing scheme based on the obtained consistent based hashing scheme data, wherein the consistent based hashing scheme corresponds to an assignment of object keys to one or more keymap coordinators, wherein each keymap coordinator is assigned a portion of the object keys based at least in part on a hash value of each object key within the assigned portion;

obtaining a request for modifying keymap information associated with an object, the keymap information corresponds to a mapping of a key associated with an object with one or more identifiers of instances of the object on the distributed storage system, the request identifying a key associated with the object; and selecting a keymap coordinator from one or more keymap coordinators in accordance with the updated consistent based hashing scheme and based on a hash value of the key associated with the object.

18. The method as recited in claim 17, wherein the distribution model corresponds to a peer-to-peer distribution model.

19. The method as recited in claim 17, wherein the distribution model corresponds to utilization of a gossip protocol.

* * * * *